United States Patent [19]

Mori et al.

[11] Patent Number: 4,606,719

[45] Date of Patent: Aug. 19, 1986

[54] COMBUSTION APPARATUS

[75] Inventors: Keiichi Mori, Izumiotsu; Katsuhiko Yamamoto, Nabari; Mitsuhiro Imajima, Yamatokooriyama; Kuniaki Uchida, Kashihara, all of Japan

[73] Assignee: Matsushita Electric Industrial Co., Ltd., Osaka, Japan

[21] Appl. No.: 682,672

[22] PCT Filed: Apr. 17, 1984

[86] PCT No.: PCT/JP84/00194

§ 371 Date: Dec. 18, 1984

§ 102(e) Date: Dec. 18, 1984

[87] PCT Pub. No.: WO84/04150

PCT Pub. Date: Oct. 25, 1984

[30] Foreign Application Priority Data

Apr. 19, 1983 [JP] Japan ................................ 58-69432
Apr. 20, 1983 [JP] Japan ................................ 58-70332
May 27, 1983 [JP] Japan ................................ 58-94311

[51] Int. Cl.$^4$ .............................................. F23H 5/00
[52] U.S. Cl. ........................................ 431/63; 431/28; 431/76; 431/37; 431/208
[58] Field of Search ...................... 431/24, 26, 28, 63, 431/76, 36, 37

[56] References Cited

U.S. PATENT DOCUMENTS 4,362,499 12/1982 Nethery ................................ 431/76
4,439,138 3/1984 Craig et al. ........................... 431/76

Primary Examiner—Carroll B. Dority, Jr.
Attorney, Agent, or Firm—Birch, Stewart, Kolasch & Birch

[57] ABSTRACT

The disclosure is directed to a safety arrangement adapted to detect the incomplete combustion of a burner to stop the combustion in a combustion apparatus for burning a mixture of fuel and air. Through employment of an oxygen concentration cell type sensor (25), by setting the burner to be at a low air/fuel ratio (rich air/fuel mixture), ignition performance has been improved, while simultaneously, through utilization of the fact that the sensor electromotive force is large during a low air/fuel ratio, it is made possible to detect the ignition of the burner quickly and positively.

In addition, it is so arranged that voltage is applied to the sensor (25) from outside, so that, by utilizing temperature characteristics of the internal resistance of the sensor (25), misfire of the burner is positively detected.

5 Claims, 11 Drawing Figures

COMBUSTION APPARATUS

TECHNICAL FIELD

The present invention improves safety measures in a combustion apparatus by the employment of an oxygen concentration cell type sensor for detecting incomplete combustion in a combustor such as a petroleum or gas fan heater, stove or the like.

BACKGROUND ART

Figure 1:
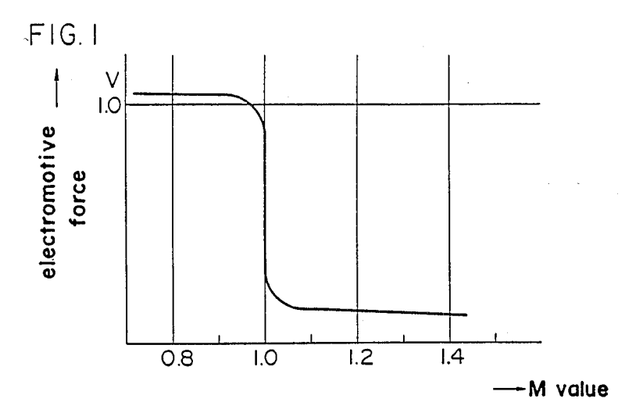
FIG. 1 is a characteristic graph of the output of an oxygen concentration cell type sensor for detecting incomplete combustion.
Figure 2:
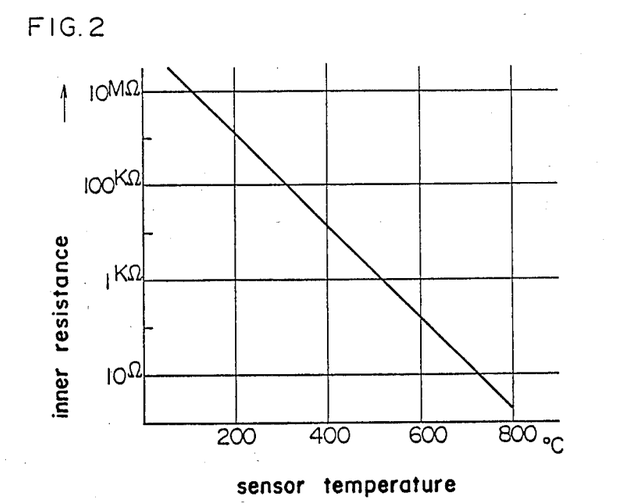
FIG. 2 is a temperature characteristic graph of the sensor.
Figure 3:
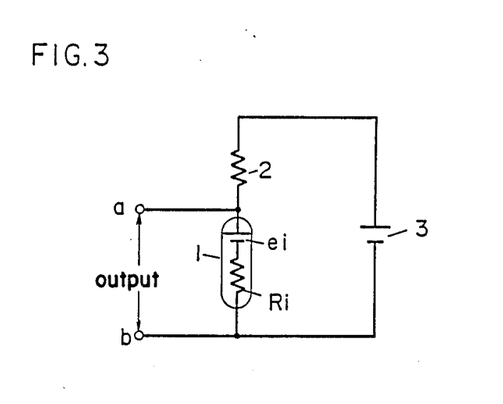
FIG. 3 is a circuit diagram for the conventional incomplete combustion detection and ignition detection.

A sensor of an oxygen concentration cell type such as a zirconia sensor is generally known as a sensor for detecting incomplete combustion and is put into practical use in a combustor using gas as fuel. The zirconia sensor has certain characteristics wherein electromotive force suddenly changes at an air fuel ratio (hereinafter referred to as M value) $M \leq 1$ as shown in FIG. 1 in a high temperature atmosphere, and the inner resistance reduces due to the temperature increase as shown in FIG. 2. Accordingly, it is used also as a sensor, with the use of the temperature characteristics, for detecting an accidental fire as well as the ignition of a fire. FIG. 3 shows one example of the detecting circuit. In the drawing, 1 is a zirconia sensor, which is made equivalent to the electromotive force $e_i$ and the inner resistance Ri. Resistor 2 is connected to a DC power supply 3 and in series with the zirconia sensor 1 and forms a voltage divider with the sensor device. At a and b are detection output terminals, respectively.

Before combustion, the inner resistance Ri becomes several hundred megohms, which is sufficiently larger than the series resistance 2, and the output electric potential becomes almost equal to the current power supply 3.

When the burner is operative, the inner resistance Ri lowers through the increase in temperature and becomes a value sufficiently smaller than the series resistance 2. The divided voltage potential through the series resistance 2 and the inner resistance Ri, therefore, drops as shown with a solid line A in FIG. 4 to an extremely small value. Accordingly, the detection of the drop in voltage can indicate that the burner has ignited. However, the conventional construction is uneconomical in power consumption as the voltage is normally applied directly to the sensor and the power supply circuit is required to impress the stabilized voltage to the sensor to positively detect the ignition because of a large dispersion of the inner resistance of the sensor so that a power-supply stabilizing circuit is required, thus resulting in complicated construction and higher cost.

As a method of solving such a problem, it is considered that voltage application to the sensor should stop and only the electromotive force $e_i$ of the sensor itself should be outputted. However, in this case, there is a problem wherein the output of the sensor will not suddenly change if the burner is ignited and the ignition detection becomes difficult to perform. Namely, although the sensor is heated with the combustion heat, when the burner is ignited, to start to generate the electromotive force of the oxygen concentration difference portion, the electromotive force change is slight, because the combustion is performed (the broken line A' range of FIG. 4) in the normal air fuel ratio zone (hereinafter referred to as a normal M value). Accordingly, there is no change in the sensor output, which makes it difficult to distinguish between the presence and the absence of the ignition.

A first object of the present invention is to ignite the burner, in a condition where the voltage application is not performed upon the sensor, in a range, i.e., a low air fuel ratio (hereinafter referred to as a low M value) smaller than 1 in the air fuel thereby to remove the above-described problems, that is, to ensure the ignition detection and to improve economy and cost.

Also, although carbon monoxide is produced in the case of the low M value ignition, a second object of the present invention is to reduce the production amount of the carbon monoxide as much as possible by the movement of the burner combustion to the normal M value simultaneously with the ignition detection.

Also, it is not desirable that much of the carbon monoxide which is harmful to the human body is contained in the combustion exhaust gas to be produced upon the ignition at the low M value. Accordingly, time required from the combustion start to the ignition detection preferably as short as possible. A third object of the present invention is to preheat the sensor to try to shorten the time required for the ignition detection.

Figure 4:
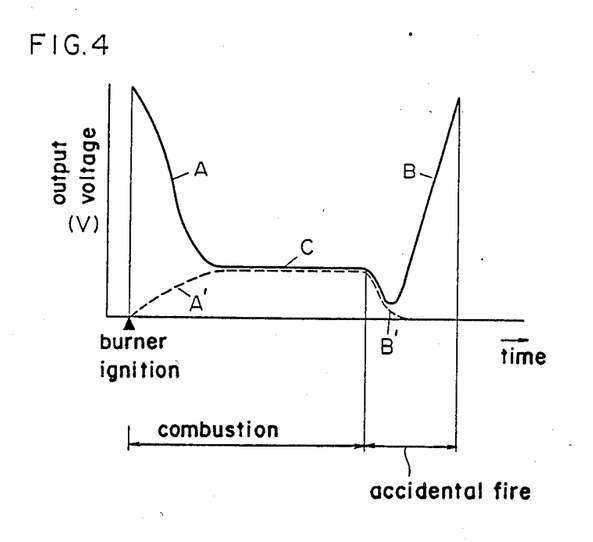
FIG. 4 is a characteristic chart of the sensor output in the same circuit.

In a type of voltage application to the conventional sensor, the temperature of the sensor falls when an accidental fire occurs for some reason, so that the inner resistance Ri becomes 100 megohms as before the combustion and the output potential abruptly rises as far as to an approximately equal value as that of the DC power supply 3 as shown with a solid line B of FIG. 4. Accordingly, the accidental fire in the burner can be detected through the detection of the voltage increase. However, although the changes in the electromotive force of the sensor itself are required to be used as an accidental signal in a type in which the voltage is not applied to the sensor, the electromotive force hardly changes as shown with a broken line B' of FIG. 4 when the burner is being burned in a normal M value condition of 1.0 or more in M value. Accordingly, it is difficult in the circuit design to detect it as an accidental fire through the electromotive-force difference even if the electromotive force of the sensor becomes zero due to the accidental fire of the burner, and error operations may often be caused even if the accidental fire is adapted to be detected.

Thus, a fourth object of the present invention is prevent voltage application to the sensor during the burner ignition. Rather, the voltage is applied to the sensor after the lapse of a given amount of time to enable the accidental fire to be positively detected.

DISCLOSURE OF INVENTION

To achieve the above-described object, according to the present invention, the burning condition of the burner is detected by a sensor of an oxygen concentration cell type to ignite the burner at a low air fuel ratio. An ignition detecting circuit is provided to detect an ignition signal output from the sensor when the sensor is to be generated by burner ignition. Also, the ratio is adapted to be switched from the low air fuel ratio to the normal air fuel ratio in accordance with the output of the ignition detecting signal from the ignition detecting circuit.

Also, the sensor is adapted to be preheated before the start of the combustion.

In addition, the voltage is adapted to be applied to the sensor after the lapse of the given time without being applied to the sensor at the burner ignition.

According to the above-described construction, only the electromotive force of the sensor itself is adapted to be drawn out as an ignition signal and the ignition is effected in the low M value condition so that the sensor largely changes in output to ensure the ignition detection of the burner. A result is that the construction becomes more economical and the price becomes lower without the power consumption due to the application of the power voltage upon the sensor and the cost increase due to the addition of a stabilizing power circuit. In addition, the present invention has a substantial effect in that the ignition error hardly is minimal and the positive ignition is ensured, because the ignition is performed at a low M value, i.e., at dense mixed gas.

Also, as the sensor is preheated in advance by a preheater and is ignited in a low M value, the sensor produces a large electromotive force simultaneously with the ignition of the burner to momentarily detect the ignition to switch the value into a normal M value. Accordingly, the amount of the carbon monoxide or the like to be produced during the ignition detection becomes extremely small, which ensures higher safety.

Furthermore, as the voltage is adapted to be applied to the sensor after the lapse of the given time without being applied to the sensor at the burner ignition, the output from the sensor abruptly changes because of change in the inner resistance when an accidental fire occurs in the burner. Accordingly, detection can be performed by the use of the output change, and a combustion apparatus high in safety can be provided.

BEST MODES FOR CARRYING OUT THE INVENTION

Figure 5:
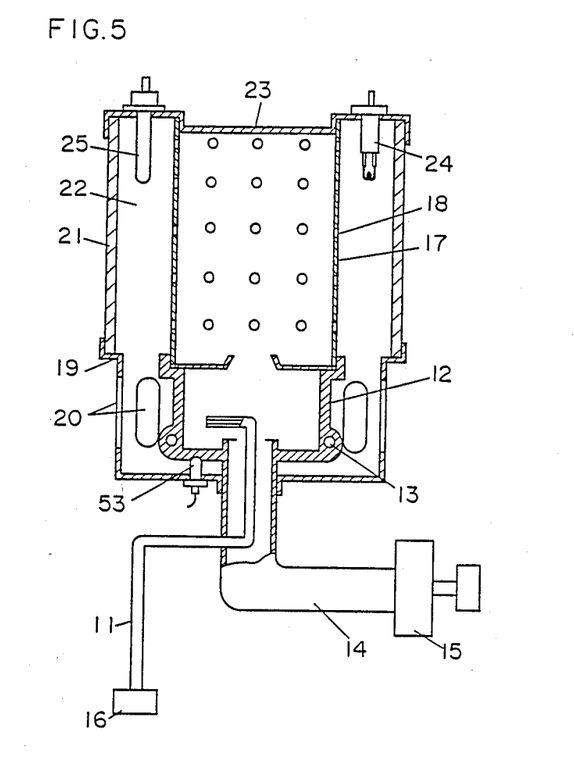
FIG. 5 is a cross-sectional view of a combustion apparatus in a first embodiment of the present invention.

One embodiment will be described hereinafter with reference to the drawings. FIG. 5 shows one example of a combustion apparatus with petroleum as fuel, wherein 11 is a fuel pipe, 12 is a vaporizing pipe for vaporizing the fuel from the fuel pipe 11, 13 is a heater for preheating the vaporizing pipe 12, 14 is a blowing pipe for feeding the air for combustion use into the vaporizing pipe 13, 15 is a blower, 16 is a fuel pump, 17 is a burner pipe disposed on the vaporizing pipe, 18 is a through hole formed in the burner pipe, 19 is an exhaust pipe disposed to surround the outer periphery of the vaporizing pipe 12, 20 is an exhaust port, 21 is a heat-proof heat transmission pipe, 22 is a combustion chamber formed between the heat-proof heat transmission pipe 21 and the burner pipe 17, 23 is a cover unit covering the burner pipe 17 and the heat-proof heat transmission pipe 21, 24 is an igniter mounted on the cover unit 23, and 25 is a sensor for detecting the incompletion of combustion mounted on the cover unit 23.

The sensor 25 made of zirconia ($ZrO_2$) as a material is an oxygen concentration cell type of sensor for producing electromotive force due to changes in the oxygen concentration, and is adapted to detect the ignition of the burner and the incomplete combustion.

Figure 6:
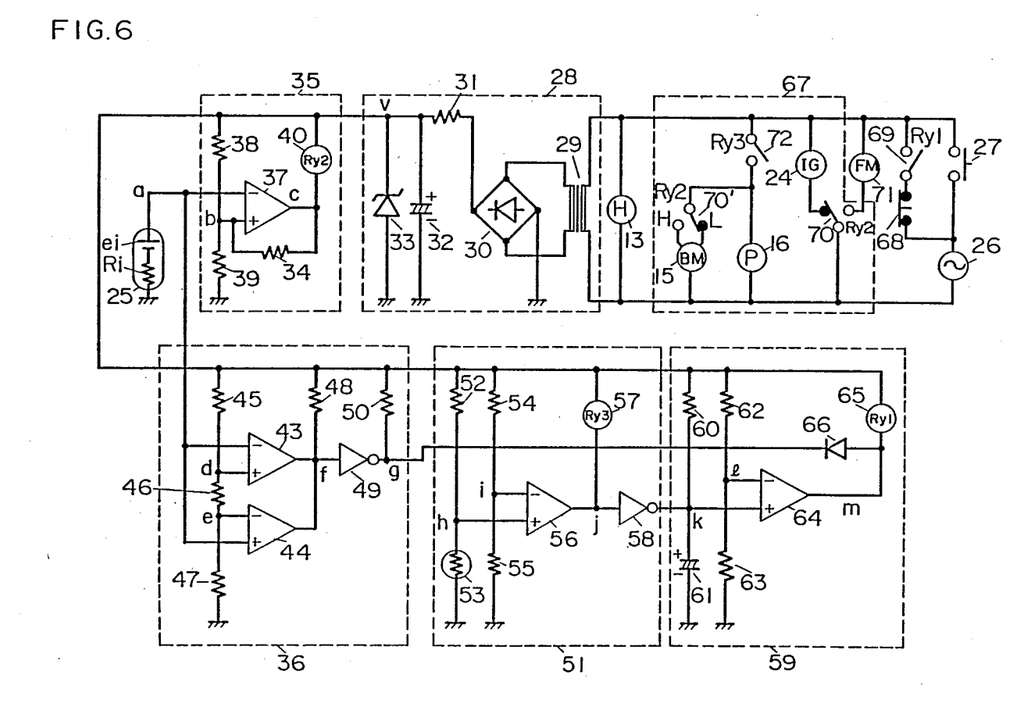
FIG. 6 is a circuit diagram in the embodiment of FIG. 5.

A concrete circuit construction for detecting the ignition and incomplete combustion of the burner will be described with the use of FIG. 6. Located at 26 is an AC power supply, which is applied to a power supply transformer 29 of a power supply circuit 28 through an operation start switch 27. The power supply circuit 28 has the output of the transformer 29 rectified by a diode bridge 30 so that it is smoothed and made constant in voltage by a resistor 31, a capacitor 32, and a constant voltage diode 33 for feeding DC power to each type of control circuit. The output potential a of the sensor 25 outputs a signal to an ignition detecting circuit 35 and a combustion condition detecting circuit 36. The potential a is inputted to a negative input terminal of a comparator 37 of the ignition detecting circuit 35 and is compared with the partial pressure potential b of the resistors 38 and 39 inputted to the positive input terminal to produce the output c. The output c of the comparator 37 is connected to the power supply circuit 28 through the coil 40 of the relay Ry 2 and is connected to the b potential through a positive feedback resistor 34. A combustion condition detecting circuit 36 has the output potential a of the sensor 25 compared respectively with the potentials d and e, divided in voltage through the resistors 45, 46, and 47, by a comparator 43 to thereby construct a wind comparator circuit. The output f of the comparators 43 and 44 are pulled up by the resistor 48 and inputted in the inverter circuit 49 thereby producing the output potential g. At 51 is a preheating circuit of a heater 13 for preheating the vaporizing pipe 12 (FIG. 5). The division-voltage potential h of the resistor 52 and the temperature sensor 53 (where a negative characteristic temperature-sensing resistance element are used) of the vaporizing pipe 12 is compared with the division-voltage potential i of the resistors 54 and 55 thereby providing an output potential j. The output j of the comparator 56 is connected to the power supply circuit 28 through the coil 57 of the relay Ry 3 and is inputted to an inverter circuit 58. The output of the inverter circuit 58 is connected to the division-pressure potential k of the resistor 60 and the capacitor 61 of a timer circuit 59. The timer circuit 59 compares the potential k with the division-voltage l of the resistors 62 and 63 by a comparator 64, and the output m is connected to the coil 65 of the relay Ry 1 and is connected to the anode of the diode 66. The cathode of the diode is connected to the output potential g of the combustion condition detecting circuit 36.

Also, an igniting circuit 67 is connected to the AC power supply 26. An igniting circuit 67 is supplied with power by a series circuit of an operation switch 27, a stop switch 68 connected in parallel to it, and a contact 67 of the relay Ry 1. An igniter 24 is connected to the NC contact of a first contact 70 of the relay Ry 2 and a motor 71 for driving a blowing fan (not shown) of the hot water. A fuel pump 16 and a blower 15 for combustion use are connected to the contact 72 of the relay Ry 3. The blower 15 for combustion use allows the Hi-Lo switching operation of the blowing amount to be effected, which is switched by a second contact 70' of the relay Ry 2. At 13 is a heater for preheating the vaporizing pipe 12. The comparators 37, 43, 44, 56 and 64 described here use the comparator of the generally known two input open collector output. The inverter circuits 49 and 58 also use the inverter of the open collector output.

The operation of the combustion apparatus will be described hereinafter. By depressing operation switch 27, the heater and the power supply circuit 28 are energized, and the power is fed to a preheating circuit 51 and a timer circuit 59. The sensor 25 is made equivalent by an inner resistor Ri and an electromotive force $e_i$ as shown.

At first, the atmosphere temperature of the sensor is equal to room temperature, the inner resistor Ri is as large as several hundreds megohms in impedance and the electromotive force $e_i$ is also zero. Thus, a becomes smaller than b as compared with the reference potential b, and the output c of the comparator 37 becomes Hi output. As the comparator 37 is the open collector output as described hereinabove, the output Hi is equal to the open and the coil 40 of the relay Ry 2 is not energized. Accordingly, both the contacts 70, 70' are retained at a contact NC and the igniter 24 is energized. At this time, the electric potential b becomes the division-pressure electric potential of a resistor 38, the impedance of the coil 40 of the relay Ry 2 in parallel to it, a parallel circuit of a resistor 34 and a resistor 39.

Also, in the preheating circuit 51, the resistance value of the temperature sensor 53 becomes larger so that the potential h becomes larger than i because of low temperature of an initial evaporator, the output j of the comparator 56 is Hi, and the relay Ry 3 57 is not conducted, either. Thus, the pump 16 and the blower 15 are not operated. At the same time, the output of the inverter 58 becomes Lo output to prevent the capacitor 61 of the timer circuit 59 from being charged. Accordingly, the potential k becomes almost zero volt and the output m of the comparator 64 becomes Lo output, because the electric potential k is smaller than l. Therefore, the relay Ry 1 is conducted and the power keeps feeding by a contact 69 if the operation switch 27 is released. Namely, at the early stage, the heater 13 and the igniter 24 operate to perform the heating operation.

As the temperature of the evaporizing pipe 12 rises and the resistance value of the temperature sensor 53 drops, the electric potential h drops to approach the potential i. The potential i is designed to become equal to the potential h at a time when the temperature of the vaporizing pipe has reached a temperature at which the fuel can be evaporated, and the comparator 56 becomes Lo output, when the potential h has become smaller than the i or equal to the i, to conduct the relay Ry 3. The fuel pump 16 and the blower 15 are operated. As the relay Ry 2 is not operated, the blower 15 becomes lower in an amount and the fuel to be fed from the fuel pump 16 causes the air amount to be lower than the required air amount. Namely, it is a low M value at which dense mixed gas is fed to improve the ignition performance. When the output j of the comparator becomes a Lo output, the inverter 58 becomes a Hi output (open), and the capacitor 61 of the timer circuit 59 begins to be charged through a resistor 60. When the burner is not ignited for some reason, the comparator 64 becomes Hi output at a time point, when the potential k has become larger than l or equal to l because of the charging of the capacitor 61, to cut off the relay Ry 1 to stop the operation. When the burner is ignited, before the potential k becomes larger than l or equal to l, to have normal combustion, the coil of the relay Ry 1 is conducted through a diode 66 to be described later, and continues its conduction, even if the output m of the comparator 64 becomes Hi, to cause the combustion to be continued.

When the burner has been ignited before the timer circuit 59 turns off the relay Ry 1, the atmosphere temperature of the sensor 25 rises through the heating operation of the burner so that the sensor 25 becomes detectable. The sensor 25, which is an oxygen concentration cell, produces electromotive force in accordance with the oxygen density in the combustion exhaust gas when the atmosphere temperature of the sensor is higher than the sensor operation temperature. Namely, the electromotive force of about 0.8 V is produced when the air amount (low M value) has become less than the theory air amount of the burner, and the electromotive force becomes almost zero when the air has become excessive.

Figure 7:
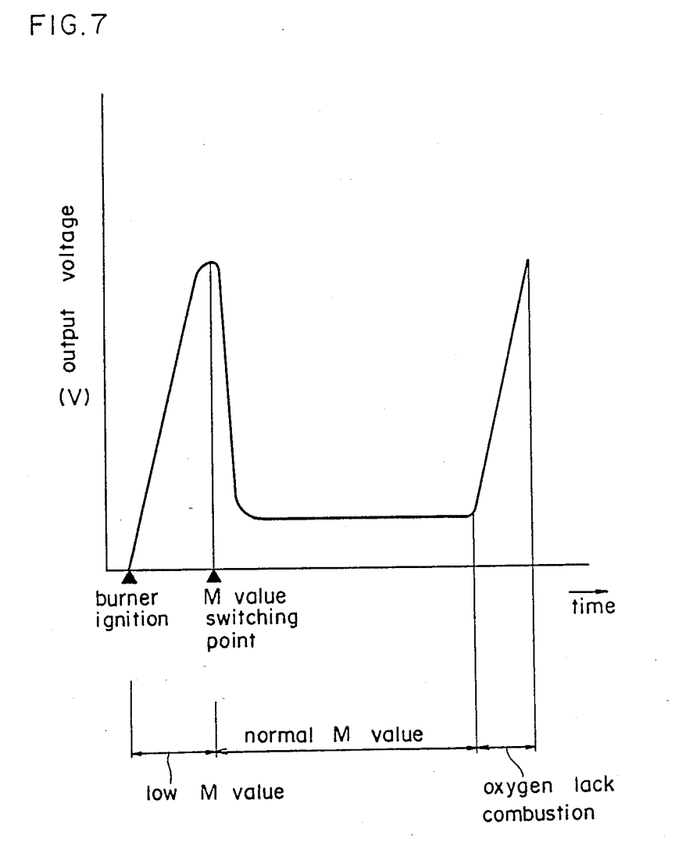
FIG. 7 is an output characteristic chart of the sensor in the embodiment of FIG. 5.

As the ignition of the burner is performed through the supply of the mixed air at a low M value as described hereinabove, the combustion condition becomes equal to a kind of incomplete combustion, and the sensor senses it as shown in FIG. 7 to output the electromotive force $e_i$. Namely, the electromotive force is caused, when the burner has been ignited, to allow the ignition detection to be performed. And the ignition detecting circuit 35 detects the electromotive force to cause the combustion to move into the normal M value condition. Namely, when the electromotive force $e_i$ of the sensor 25 becomes higher than the potential b of the ignition detecting circuit 35, the output c of the comparator 37 becomes a Lo output to energize the coil 40 of the relay Ry 2. The contact 70 is switched from the NC side to the NO side to stop the operation of the igniter 24 to drive the fan motor 71, thereby releasing the hot air into the room and simultaneously switching the contact 70' of the relay Ry 2 onto the NO side to turn the burner motor 15 into Hi airflow. Namely, the combustion airflow suitable for the supply fuel of the pump 16 comes to be fed and the combustion moves to the normal M value combustion. Although the burner returns to the normal M value combustion and the electromotive force $e_i$ of the sensor 25 also lowers, the output c remains Lo by the positive feedback resistor 34 of the comparator 37. The comparator 37 becomes Lo output, and simultaneously the potential b' becomes the division-pressure potential of the resistor 39, the parallel resistance of the resistor 34, and the resistor 38, and becomes a sufficiently low value as compared with the b potential at a time when the output c of the comparator 37 is in the Hi. If the electromotive force $e_i$ of the sensor 25 lowers, the output c remains the Lo to keep the potential a larger than b'.

The combustion condition detecting circuit 36 compares a potential equal to the electromotive force $e_i$ of the sensor 25 with potentials d and e by comparators 43 and rr, respectively, to detect the combustion condition thereby stopping the combustion when the incomplete combustion occurs.

In the above-described embodiment, the description was given in an example composed of electronic circuits, but these combustion sequences can be easily realized if they are composed of a program and, in this case, the circuit construction is simplified and highly precise, complicated control sequence, can be easily realized. Also, the blower 15 switches the Hi-Lo air amount by the revolution number of the motor and the air amount can also be performed easily by a wind passage switching system through a dipper or the like. Also, the burner with petroleum as fuel was described, but a burner with gas as fuel provides similar effect.

Figure 8:
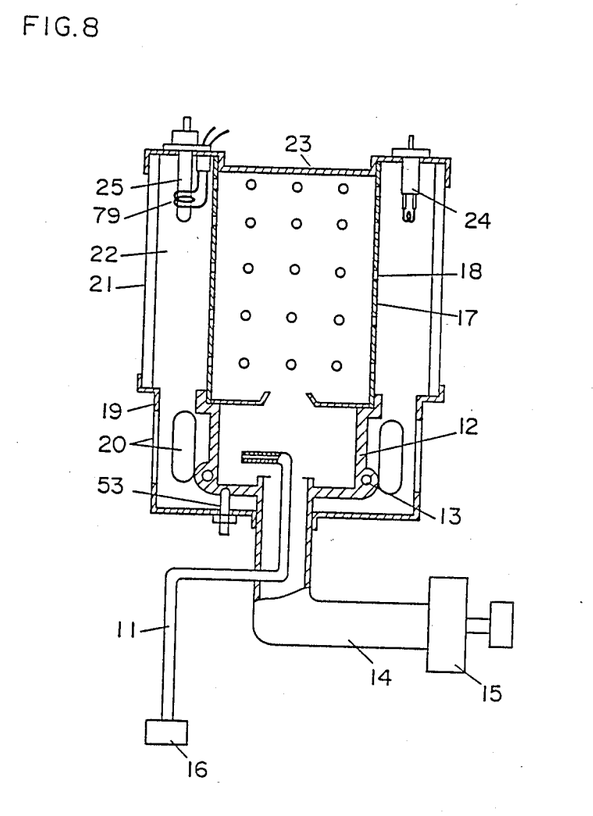
FIG. 8 is a cross-sectional view of a combustion apparatus in a second embodiment of the present invention.

FIG. 8 shows a second embodiment of the present invention, which is different from the above-described embodiment in that the preheating heater 79 is provided for heating the sensor 25 before the combustion start is provided. Although the circuit diagram is not shown, a preheating heater 79 is required to be electrically connected in parallel to the ignition transformer 24.

Figure 9:
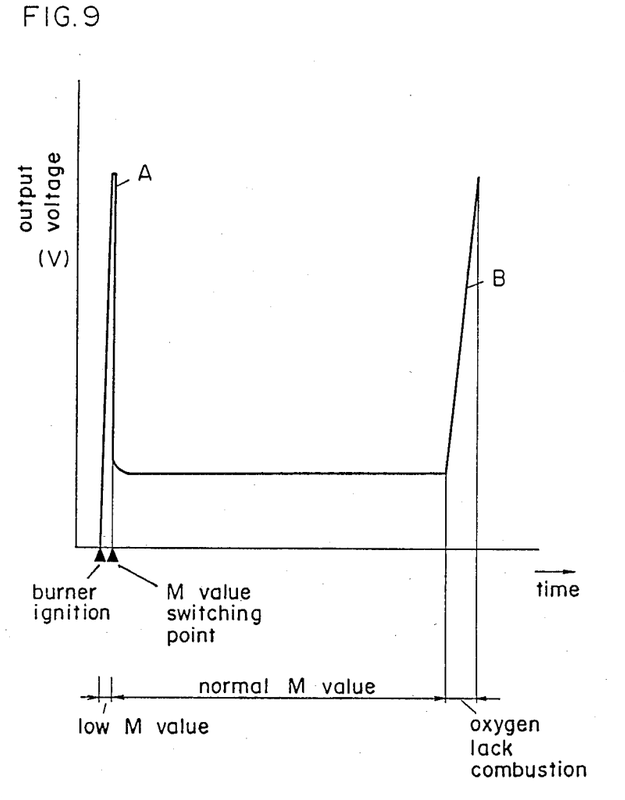
FIG. 9 is an output characteristic chart in the embodiment of FIG. 8.

In this operation, as the burner is ignited at a low M value as described hereinabove, the burner becomes equal to a kind of incomplete combustion simultaneously with the ignition, and the sensor 25 detects it to produce the electromotive force, but the sensor 25 is heated in advance by a preheating heater 79 into a detectable condition so that the large electromotive force is produced simultaneously with the ignition of the burner as shown in FIG. 9A. Accordingly, the ignition detection is momentarily performed. The ignition detecting circuit 35 detects the large electromotive force of the sensor 25 to move the combustion to the normal M value combustion as described hereinabove, but as the sensor 25 is adapted to be sufficiently heated with the heat from the burner at this time, the current flowing to the preheating 79 is turned off to save energy.

When the abnormal combustion of the incomplete combustion or the like is caused, the output potential a of the sensor 25 rises abruptly as shown in FIG. 9B and the comparators 43 and 44 of the combustion condition detecting circuit 36 detect it to energize the relay 65 through an inverted 49, a diode 66 to turn off the relay contact 69 thereby stopping the combustion.

It is to be noted that an igniter of a heater type is used as an igniter 24 and is provided close to the sensor 25 so that the sensor 25 may be preheated with the igniter 24.

Figure 10:
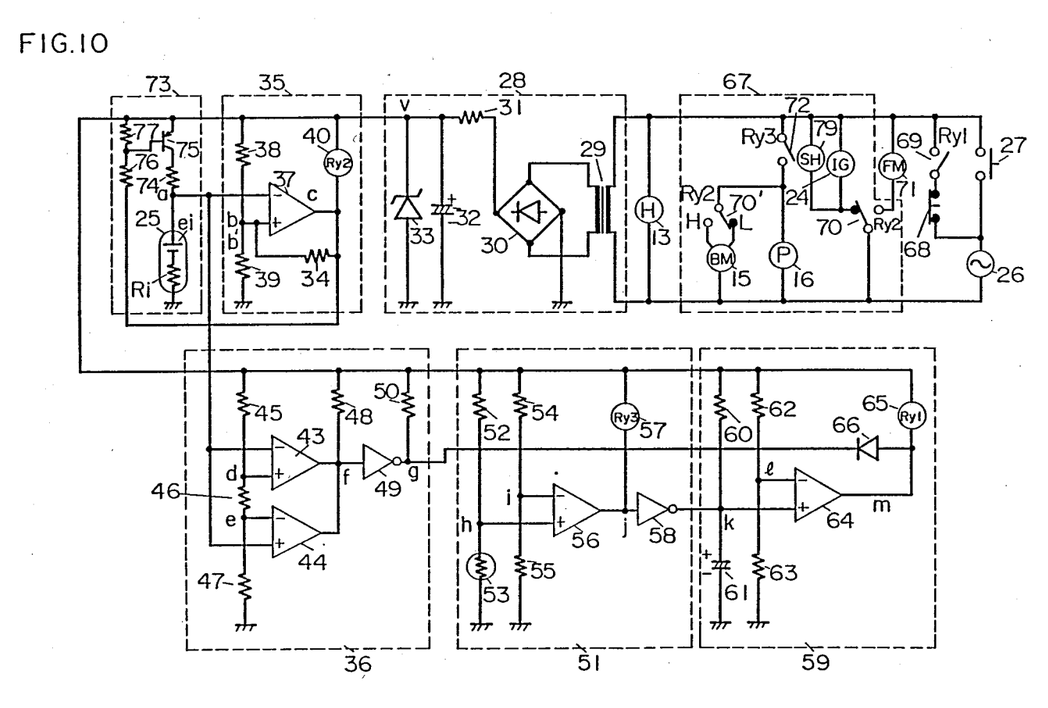
FIG. 10 is a circuit diagram in a third embodiment of the present invention.

A third embodiment of the present invention will be described with reference to FIG. 10. In the present embodiment, voltage is not applied to the sensor at the ignition time, but the voltage is adapted to be applied to the sensor after the given time period. Namely, in FIG. 10, 73 shows a sensor which obtains the output of the sensor 25. A series resistor 74 and a switching transistor 75 are connected in series to the sensor, and the base of the transistor 75 is connected to the output c of the comparator 37 of the ignition detecting circuit 35 through the resistor 76. the emitter base resistor of the transistor 75. Also, the preheating heater 79 is connected in parallel to the igniter 24.

The operation of the third preferred embodiment will be described hereinafter. The operation switch 27 is depressed and the heater 13 and the power supply circuit 28 are energized to feed the power to the ignition detecting circuit 35, the combustion condition detecting circuit 36, the preheating circuit 51, and the timer circuit 59.

As the atmosphere temperature of the sensor is, at first, equal to the room temperature, the inner resistance Ri is as large in impedance as several hundreds megohms and the electromotive force $e_i$ is also zero as shown in FIG. 7A. Thus, a is smaller than b as compared with the reference potential b, and the output c of the comparator 37 becomes a Hi output. As the comparator 37 is an open collector output as described hereinabove, the output Hi is equal to the open and the current does not flow to the relay Ry 2 coil 40. Hence, both contacts 70 and 70' are maintained at the NC contact, and the preheating heater 79 of the igniter 24 and the sensor 25 are energized.

Also, in the preheating circuit 51, the resistance value of the temperature sensor 53 is large because of the low temperature of the initial vaporizing pipe, the potential h becomes larger than i, the output i of the comparator 56 is Hi and the relay Ry 3 57 is also not conducted. Accordingly, the pump 16 and the blower 15 do not operate. At the same time, the output of the inverter 58 becomes Lo to prevent the capacitor 61 of the timer circuit 59 from being charged. The potential k becomes almost zero in voltage, and the output m of the comparator 64 becomes a Lo output, because the potential k is smaller than 1. Consequently, the relay Ry 1 is conducted to keep feeding the power with the contact 69 even if the operation switch 27 is released. At the early stage, the heater 13, the igniter 24, and the heater 79 for sensor use are operated to perform the preheating operation.

As the temperature of the vaporizing pipe 12 rises and the resistance value of the temperature sensor 53 lowers, the potential h lowers and approaches the potential i. The potential i is designed to become equal to the potential h available at the temperature of the vaporizing pipe wherein the fuel can be vaporized, and when the potential h has become smaller than i or has become equal to i, the comparator 56 becomes Lo in output to cause the relay Ry 3 to conduct. Thus, the fuel pump 16 and the blower 15 operate. As the relay Ry 2 does not operate, the blower 15 becomes low in air amount and the air amount is smaller than the air amount required for the fuel to be fed from the fuel pump 16. The mixed gas, which is of a low M value and is dense, is fed to improve the ignition peformance. At the same time, the output c of the comparator 37 is Hi and thus the transistor 75 of the sensor circuit 73 does not conduct so that the power from the power supply circuit 31 is not fed to the sensor 25. Accordingly, the comparator 37 keeps detecting only the electromotive force $e_i$ of the sensor 25 when the output j of the comparator 56 becomes Lo, the inverter 58 becomes a Hi output (open), the charging operation starts through the resistor 60 into the capacitor 61 of the timer circuit 59, and the comparator 64 becomes Hi in output. At a time point when the potential k has become larger than 1 or has become equal to 1, the coil 65 of the relay Ry 1 is energized to cut off the contact 69 thereby stopping the operation.

Figure 11:
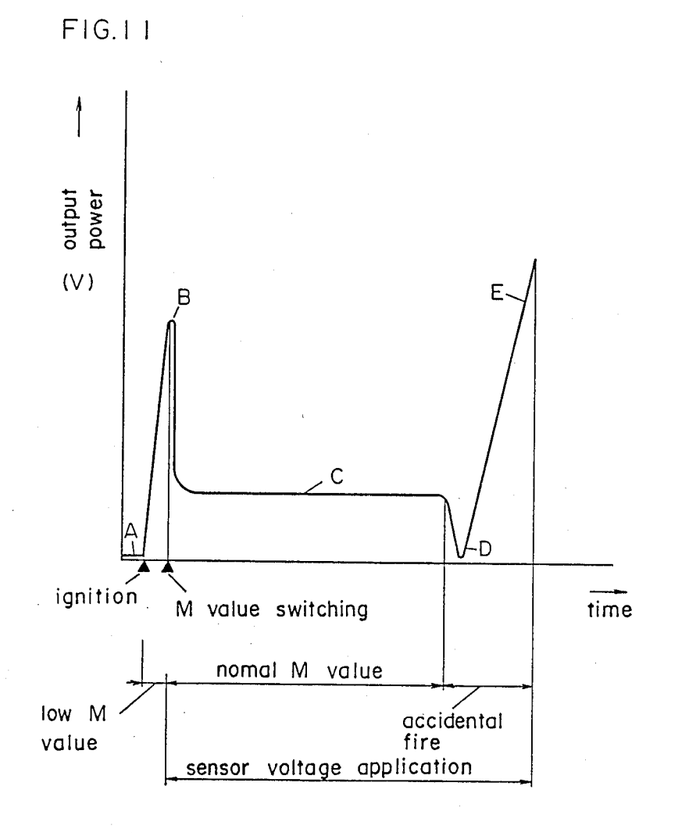
FIG. 11 is an output characteristic chart of the sensor in the embodiment of FIG. 10.

When the burner has been ignited before the timer circuit 59 turns it off to flow the current to the coil 65 of the relay Ry 1, the combustion condition detecting circuit 36 compares and decides the output from the sensor 25 to keep the current flowing to the coil 65 of the relay Ry 1 through the diode 66 to continue the combustion. At this time, the sensor 25 produces the electromotive force momentarily to shorten the ignition detection. Namely, as the burner is ignited at a low M value as described hereinabove, the burner becomes equal to a kind of incomplete simultaneously with the ignition. The sensor 25 detects the incompletion to produce the electromotive force, but as the sensor 25 is heated in advance by the preheating heater 73 and becomes detectable as described hereinabove, the large electromotive force is produced simultaneously with the ignition of the burner as shown in FIG. 11B. Accordingly, the ignition detection is momentarily performed.

When the ignition detecting circuit 35 detects the large electromotive force of the sensor 25 (higher than the potential b) produced in such a manner as described hereinabove, the output of the comparator 37 becomes Lo to energize the coil 40 of the relay Ry 2. Hence, the contact 70' is switched onto the NO side to get the blower 15 brought into the Hi air amount. Namely, the combustion air amount suitable for the supply fuel of the pump 16 comes to be fed for normal combustion to provide a condition wherein carbon monoxide or the like is not produced. At the same time, the contact 70 of the relay Ry 2 is also switched from the NC side onto the NO side to stop the operation of the igniter 24 to drive a fan motor 71 thereby releasing the hot air into the chamber. At this time, the sensor 25 is adapted to be sufficiently heated with the heat from the burner, and thus the current flowing to the preheating heater 79 for heating the sensor 25 is turned off to save the power. Also, as the output c of the comparator 37 becomes Lo, the base current of the transistor 75 flows through the resistor 76 to cause the transistor 75 to become conductive. A series resistor 74 is connected in series with the sensor 25, and the current flows from the power supply circuit 28 to the sensor 25. But at this time, the temperature of the sensor 25 is sufficiently increased, and thus the inner resistor Ri is an extremely small value as compared with the series resistor 74. The division-pressure potential of the resistor 74 and the inner resistor Ri is almost zero, and the potential a becomes a condition where only the output of the electromotive force $e_i$ of the sensor 25 remains as shown in FIG. 11C.

When the burner has suddenly had an accidental fire for some reason, the sensor 25 momentarily outputs an abnormal signal, but it is considered that an abnormal signal D is not produced depending upon the accidental fire conditions. Even if the abnormal signal is outputted, it is momentary so that it may not be detected by the detecting circuit.

However, according to the embodiment of the present invention, as the current flows through the resistor 74 to the sensor 25 after the ignition detection by the sensor circuit 73 as described hereinabove, the inner resistance Ri suddenly rises due to the temperature drop of the sensor 25 even if the electromotive force $e_i$ is not caused during the accidental burner fire, so that the division-pressure potential of the series resistor 74 to be caused by the voltage application becomes a value (FIG. 11E) larger than the electromotive force $e_i$. Thus, during the accidental burner fire, the potential from the sensor 25 with respect to the potential d of the combustion condition detecting circuit 36 becomes $a \geq d$ to detect the accidental fire, and the relay 65 operates through the comparator 43, the inverter 49 and the diode 66 to turn off the contact 69 and to stop the operation.

It is to be noted that although not shown, the voltage application upon the sensor 25 may be automatically applied after the lapse of the given time period independently of the ignition detection.

INDUSTRIAL APPLICABILITY

In combustors such as a petroleum fan heater or an individual indoor heating apparatus, the carbon monoxide is prevented from being produced in large amounts through the incomplete combustion, thus improving safety. In addition, the accidental fire is positively detected to further increase safety.

What is claimed is:

1. A combustion apparatus comprising:
   burner means for burning a mixture of fuel supplied by a fuel supply device and air from a combustion air blower motor;
   sensor means for detecting a combustion condition of said burner as a function of the oxygen concentration in said mixture;
   ignition circuit means for igniting said burner; and
   ignition detection means for detecting an electromotive force of said sensor obtained by the ignition of said burner means as an ignition signal,
   said circuit means being provided with means for changing over the amount of air to be fed by the combustion air blower motor so as to maintain said burner at a low air/fuel ratio until said ignition detecting means detects said ignition signal upon actual ignition of said burner.

2. A combustion apparatus as claimed in claim 1 wherein said sensor means is provided with preheating means for preliminarily heating said sensor means prior to ignition of said burner means.

3. A combustion apparatus as claimed in claim 2, wherein said preheating means is provided with a contact means for interrupting energization of said preheating means after detecting the ignition of said burner means by said ignition detecting means.

4. A combustion apparatus comprising:
   burner means for burning a mixture of fuel supplied by a fuel supply device and air from a combustion air blower motor;
   sensor means for detecting a combustion condition of said burner means as a function of oxygen concentration in said mixture, so as to produce an electromotive force;
   ignition circuit means for igniting said burner;
   ignition detector means for detecting the electromotive force of said sensor means obtained by the ignition of said burner means;
   switching circuit means for applying voltage to said sensor means after detection of the ignition of said burner means by said ignition detection means; and
   combustion condition detecting circuit means for detecting a state, when either one of a variation of a resistance value or electromotive force obtained by said voltage application reaches a predetermined value, as a misfire or abnormal combustion signal of said burner;
   said ignition circuit means being provided with means for changing over the amount of air to be fed from the combustion air blower motor so as to maintain said burner means at a low air/fuel ratio until said ignition detection means detects the ignition of said burner upon actual ignition thereof.

5. A combustion apparatus as claimed in claim 4, wherein said sensor means is provided with preheating means for preliminarily heating said sensor means prior to ignition of said burner.

* * * * *